United States Patent
Kunieda (10) Patent No.: US 10,375,348 B2
(45) Date of Patent: Aug. 6, 2019

(54) IMAGE CAPTURING APPARATUS OPERABLE TO STORE CAPTURED IMAGE DATA IN IMAGE MEMORY, METHOD OF CONTROLLING SAME, AND STORAGE MEDIUM

(71) Applicant: CANON KABUSHIKI KAISHA, Tokyo (JP)

(72) Inventor: Shutaro Kunieda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/855,213

(22) Filed: Dec. 27, 2017

(65) Prior Publication Data

US 2018/0184041 A1    Jun. 28, 2018

(30) Foreign Application Priority Data

Dec. 28, 2016  (JP) .................................. 2016-256765

(51) Int. Cl.

| | |
|---|---|
| *H04N 5/917* | (2006.01) |
| *H04N 5/243* | (2006.01) |
| *H04N 5/77* | (2006.01) |
| *H04N 9/804* | (2006.01) |
| *H04N 5/235* | (2006.01) |
| *H04N 5/357* | (2011.01) |

(52) U.S. Cl.
CPC ........... *H04N 5/917* (2013.01); *H04N 5/2351* (2013.01); *H04N 5/2353* (2013.01); *H04N 5/243* (2013.01); *H04N 5/357* (2013.01); *H04N 5/772* (2013.01); *H04N 9/8042* (2013.01)

(58) Field of Classification Search
USPC ...................................... 348/229.1
See application file for complete search history.

(56) References Cited

U.S. PATENT DOCUMENTS

2015/0130965 A1* 5/2015 Oishi ................... H04N 19/124
348/223.1

FOREIGN PATENT DOCUMENTS

JP         2008-113070 A      5/2008

* cited by examiner

*Primary Examiner* — Joel W Fosselman
(74) *Attorney, Agent, or Firm* — Carter, DeLuca & Farrell LLP (57) ABSTRACT

An image capturing apparatus comprises: an image sensor configured to output image data captured at any of two or more sensitivities; and a memory storing instructions which cause the apparatus to function as: a control unit configured to control a compression rate for compressing the outputted image data; a compression unit configured to compress the outputted image data at the compression rate; a decompression unit configured to decompress the compressed image data; and an application unit configured to apply a gain amount to the decompressed image data based on the two or more sensitivities, wherein the control unit controls the compression rate so that a compression rate in a case where a first gain amount is applied to is less than a compression rate in a case where a second gain amount is applied to.

7 Claims, 5 Drawing Sheets

IMAGE CAPTURING APPARATUS OPERABLE TO STORE CAPTURED IMAGE DATA IN IMAGE MEMORY, METHOD OF CONTROLLING SAME, AND STORAGE MEDIUM

BACKGROUND OF THE INVENTION

Field of the Invention

The present invention relates to an image capturing apparatus operable to store captured image data in an image memory, a method of controlling the same, and a storage medium.

Description of the Related Art

In recent years, image capturing apparatuses having a configuration in which a signal obtained by applying a gain to image data obtained by setting a high capturing sensitivity for an image sensor is amplified are known. Generally, when a high gain is applied to captured image data, the noise included in the image data is also amplified, so there are cases where noise is noticeable in an image to which a gain has been applied. In particular, in an image capturing apparatus that compresses and decompresses captured RAW image data in order to improve the efficiency of a transmission with respect to an image memory, when a high gain is applied to decompressed image data, there are cases where image quality degradation arising due to compression and decompression processing is noticeable.

With respect to such a problem, Japanese Patent Laid-Open No. 2008-113070 discloses a technique of applying a gain to image data after controlling so that compression and decompression processing is not applied to RAW image data in a case of applying a gain of a predetermined value or more to image data such as that captured with a high sensitivity.

However, in the technique recited in Japanese Patent Laid-Open No. 2008-113070, because there are cases where the RAW image data is not compressed in accordance with the gain to apply, the load of transmission with respect to an image memory is not reduced, and there are cases where time required for reading/writing with respect to the image memory is not shortened. In other words, because the peak of a transmission load does not decrease more than in a case where RAW image data is not compressed, it is not possible to replace the internal configuration of the image capturing apparatus by a slower configuration. Meanwhile, to shorten the transmission time of a RAW image, there is a need for approaches such as further increasing a transmission frequency, which invites increases to apparatus cost or power consumption.

SUMMARY OF THE INVENTION

The present invention has been made in consideration of the aforementioned problems, and realizes a technique that can reduce a load of transmitting a captured image to an image memory, while suppressing a decrease in quality of an image to which a gain has been applied.

In order to solve the aforementioned problems, one aspect of the present invention provides an image capturing apparatus comprising: an image sensor configured to output image data captured at any of two or more sensitivities; an image memory; one or more processors; and a memory storing instructions which, when the instructions are executed by the one or more processors, cause the image processing apparatus to function as: a control unit configured to control a predetermined compression rate for compressing image data outputted from the image sensor; a compression unit configured to compress the image data outputted from the image sensor at the predetermined compression rate; a storage unit configured to temporarily store the image data compressed by the compression unit in the image memory; a decompression unit configured to decompress the compressed image data read from the image memory; and an application unit configured to apply a gain amount corresponding to a sensitivity of the two or more sensitivities to the image data decompressed by the decompression unit, wherein the control unit controls the predetermined compression rate so that a compression rate in a case where a first gain amount larger than a predetermined gain amount is applied to the decompressed image data is less than a compression rate in a case where a second gain amount less than the predetermined gain amount is applied to the decompressed image data.

Another aspect of the present invention provides a control method of an image capturing apparatus that has an image sensor operable to output image data captured by any of two or more sensitivities, an image memory, and a control unit, the method comprising: controlling a predetermined compression rate applied to image data outputted from the image sensor by the control unit; compressing the image data outputted from the image sensor at the predetermined compression rate; temporarily storing the compressed image data in the image memory; decompressing the compressed image data read from the image memory; and applying a gain amount corresponding to a sensitivity of the two or more sensitivities to the decompressed image data, wherein the predetermined compression rate is controlled so that a compression rate in a case where a first gain amount larger than a predetermined gain amount is applied to the decompressed image data is less than a compression rate in a case where a second gain amount less than the predetermined gain amount is applied to the decompressed image data.

Still another aspect of the present invention provides a non-transitory computer-readable storage medium storing a program for causing a computer to execute a control method of an image capturing apparatus that has an image sensor operable to output image data captured at any of two or more sensitivities, an image memory, and a control unit, the method comprising: controlling a predetermined compression rate applied to image data outputted from the image sensor by the control unit; compressing the image data outputted from the image sensor at the predetermined compression rate; temporarily storing the compressed image data in the image memory; decompressing the compressed image data read from the image memory; and applying a gain amount corresponding to a sensitivity of the two or more sensitivities to the decompressed image data, wherein the predetermined compression rate is controlled so that a compression rate in a case where a first gain amount larger than a predetermined gain amount is applied to the decompressed image data is less than a compression rate in a case where a second gain amount less than the predetermined gain amount is applied to the decompressed image data.

According to the present invention, it is possible to reduce a load of transmitting a captured image to an image memory, while suppressing a decrease in quality of an image to which a gain has been applied.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be explained hereinafter in detail, with reference to the drawings. Note that explanation is given below of an example in which a digital camera that can compress a captured image and temporarily store it in an image memory is used as an example of an image capturing apparatus. However, the present embodiment is not limited to a digital camera and can be adapted to a device that can compress a captured image and temporarily store it in an image memory. Such a device may include a mobile phone which includes a smartphone, a game device, a tablet terminal, a clock-type or glasses-type information terminal, a medical device, devices for a monitoring system or an in-vehicle system, or the like, for example.

(Configuration of Digital Camera 100)

Figure 1:
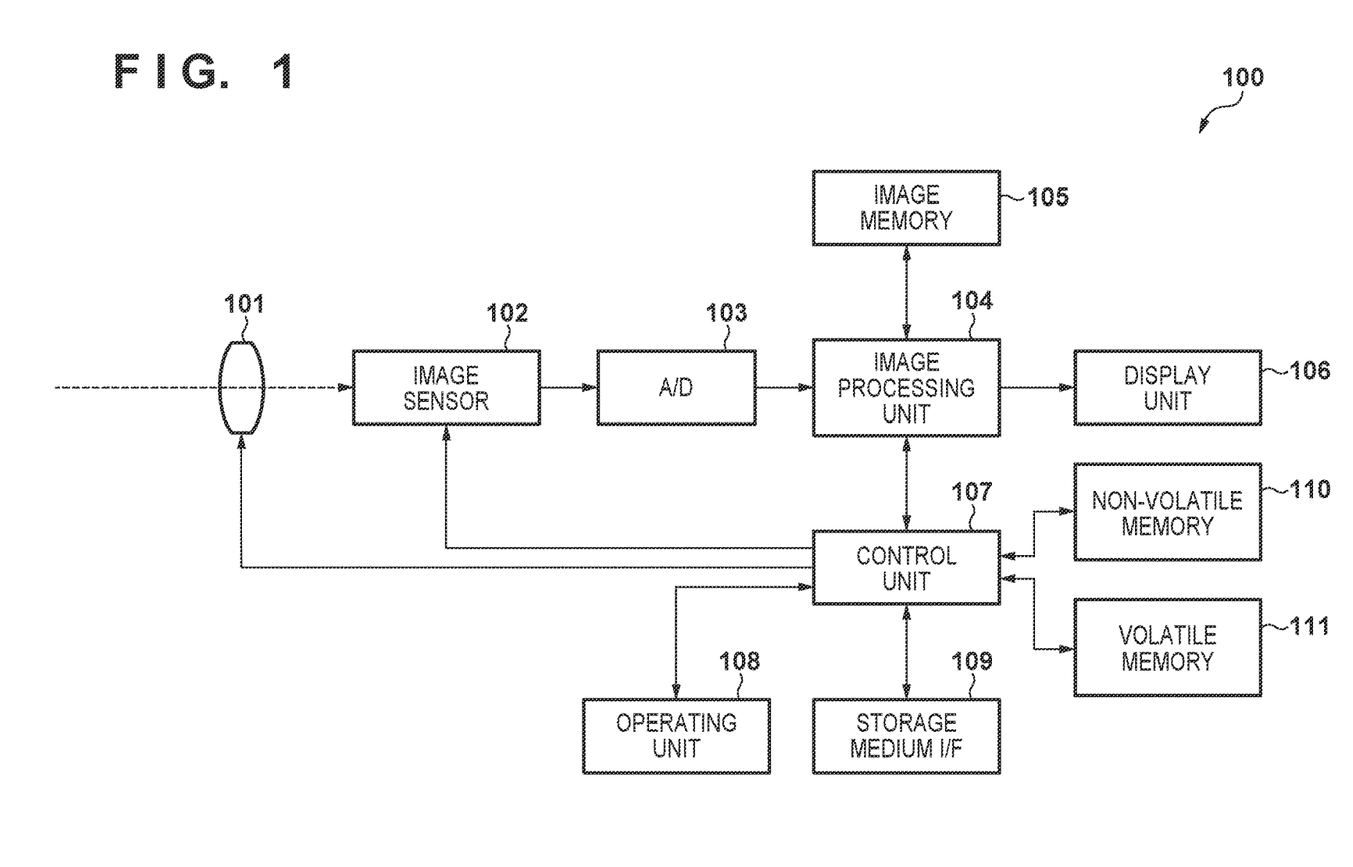
FIG. 1 is a block diagram which illustrates a functional configuration example of a digital camera as an example of an image capturing apparatus according to a first embodiment.

Description will be given for an example of a functional configuration of a digital camera 100 according to the present embodiment with reference to FIG. 1.

An imaging optical system 101 includes a lens group such as a lens in which a light from a subject is condensed into an image sensor 102, a focus lens for adjusting a focus level of an optical image of an object, and a zoom lens for performing zooming. In addition, the imaging optical system 101 includes a driving mechanism for causing each lens (imaging optical system) to move, based on a control signal from a control unit 107. Also, the imaging optical system 101 includes a shutter for causing light from a subject to be exposed on the image sensor 102 for a predetermined time period, and an aperture for controlling an exposure amount of light from a subject.

The image sensor 102 has a configuration in which a plurality of pixels each having a photoelectric conversion element are arranged two-dimensionally. The image sensor 102 performs a photoelectric conversion by each pixel on the optical image of an object formed by an imaging optical system of the imaging optical system 101 and outputs an image signal which results from conversion in accordance with a timing signal outputted from a timing generator (not shown), for example. The image sensor 102 may be an image sensor such as a CCD (Charge-Coupled Device) image sensor or a CMOS (Complementary Metal Oxide Semiconductor) image sensor.

An A/D conversion unit 103 performs analog/digital conversion on an analog image signal which is outputted from the image sensor 102 and outputs a digital image signal (image data). At this time, the A/D conversion unit 103 is configured to maintain a good S/N ratio in accordance with CDS processing, for example.

An image processing unit 104 performs processing for calculating a signal value for performing AE (Auto Exposure) or gain adjustment and processing for calculating a defocus amount for realizing AF (Auto Focus), based on image data which is outputted from the A/D conversion unit 103. In addition, various image quality correction processing is performed based on a control signal which the control unit 107 inputs in accordance with a calculation result based on image data. Also, in order to temporarily store inputted image data in an image memory 105, the image processing unit 104 can perform processing for compressing image data and processing for decompressing compressed image data read from the image memory 105. In addition, the image processing unit 104 applies a gain on decompressed image data. It can also generate display data for displaying on a display unit 106 and perform compression/decompression processing (for example, compression/decompression of image data by lossy coding such as a JPEG format or the like) for performing reading/writing to a storage medium. Image data which is compressed by the image processing unit 104 is supplied to a storage medium I/F 109 via the control unit 107 and recorded on the storage medium.

The image memory 105 includes a volatile memory, for example DRAM or the like, and temporarily stores image data which is processed by the image processing unit 104. The image memory 105 is connected with the image processing unit 104 via a memory bus which is not shown.

The display unit 106 includes a display panel such as an LCD, for example, and displays an image signal based on image data for display which is outputted from the image processing unit 104. The display unit 106 displays an image of a live-view which is currently being captured by the image sensor 102, an image for reproduction which is read from the storage medium via the storage medium I/F 109, a GUI for operation of the digital camera 100, or the like.

The control unit 107 includes, for example, a processor such as a CPU (or MPU), and executes a program stored in a non-volatile memory 110 to control each block of the digital camera 100, and control a data transfer between blocks. In addition, the control unit 107 reads various data which is stored in the non-volatile memory 110 as necessary, performs operation of a program and sets setting values in the digital camera 100. The control unit 107 controls each block of the digital camera 100 in accordance with an operation signal from an operating unit 108 which receives an operation from a user. A volatile memory 111 includes, for example, a semiconductor memory or the like, and temporarily stores various variables or the like in a work area when the control unit 107 executes programs.

The operating unit 108 includes switches for inputting various operations relating to capturing, such as a power button, a release button, buttons for instructing a moving image recording start and a moving image recording stop, or the like, for example. In addition, the operating unit 108 includes a menu display button, a decide button, a cursor keypad, a pointing device, a touch panel, or the like. When these keys or buttons are operated by the user, an operation signal is transmitted to the control unit 107. The operating unit 108 may include a touch panel, and the touch panel receives an input operation from a user by detecting contact, proximity, or pressure, for example. The operating unit 108 may include buttons on the touch panel or switches that enable capturing to be performed by switching between an expanded high sensitivity and a normal sensitivity (may be referred to as a common-use sensitivity). The expanded high sensitivity is a high sensitivity region in excess of a normal sensitivity in which an amount of noise is suppressed by a predetermined amount at a time of capturing by the image sensor, and in other words corresponds to a high sensitivity region outside of a range that can be converted by the A/D conversion unit 103, for example.

The storage medium I/F 109 includes a card slot in which the storage medium (not shown) is attached, and writes data to the attached storage medium, and reads data from this storage medium.

In the digital camera 100 described above, the display unit 106 displays the image data currently being captured on the display panel, and by confirming this image, a user can confirm an angle of view or adjust an image capturing condition. The control unit 107 starts capturing when recording of an image is instructed to the control unit 107 by the release button of the operating unit 108 being pressed by a user. When image data obtained via the image sensor 102 and the A/D conversion unit 103 is inputted to the image processing unit 104, the image processing unit 104 performs predetermined image quality correction processing such as a gain adjustment or a white balance adjustment, and also generates an image file after JPEG compression encoding or the like. Note that configuration may be taken such that it is possible to generate a RAW image data file to which image quality correction processing or compression encoding has not been performed. The control unit 107 then supplies the image file generated by the image processing unit 104 to the storage medium I/F 109 to cause recording to the storage medium. Note that the foregoing explanation is not limited to recording of an image file of a still image, and may be applied to recording of moving image data.

(Configuration of Image Processing Unit 104)

Figure 2:
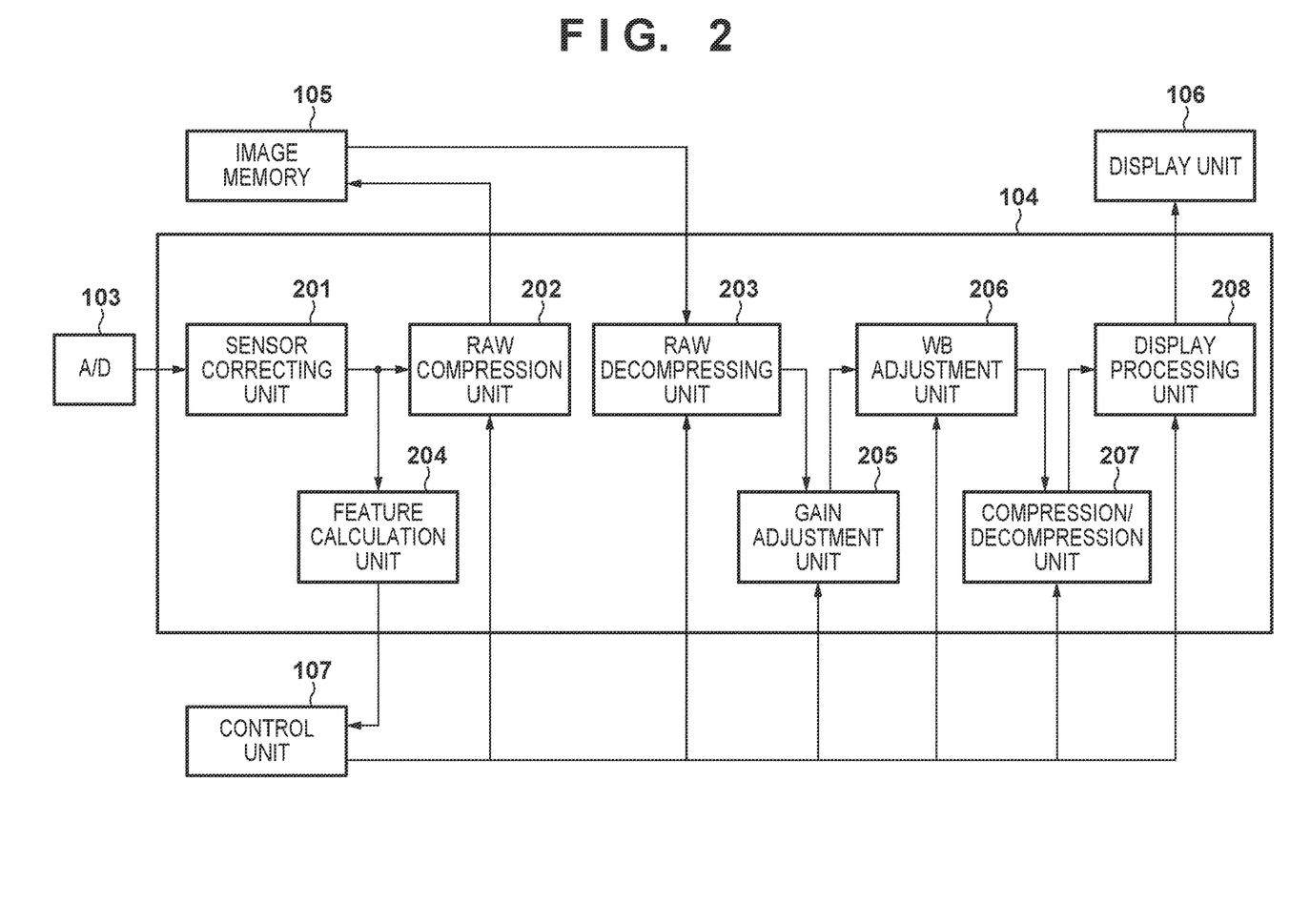
FIG. 2 is a block diagram which illustrates a functional configuration example of an image processing unit according to the first embodiment.

Next, with reference to FIG. 2, explanation is given regarding a configuration of the image processing unit 104. The image processing unit 104 according to the present embodiment includes a sensor correcting unit 201, a RAW compression unit 202, a RAW decompression unit 203, a feature calculation unit 204, a gain adjustment unit 205, a white balance (WB) adjustment unit 206, a compression/decompression unit 207, and a display processing unit 208.

The image processing unit 104 according to the present embodiment, as described later, compresses image data (RAW image data) inputted from the A/D conversion unit 103 by the RAW compression unit 202, and stores it to the image memory 105 via a memory bus. When necessary, the image processing unit 104 reads the compressed RAW image data that was stored to the image memory 105, and performs decompression processing by the RAW decompression unit 203. In addition, the image processing unit 104 according to the present embodiment performs compression on the RAW image data even in a case of applying a high gain that corresponds to capturing in accordance with the expanded high sensitivity, in addition to a case of applying a gain that corresponds to capturing in accordance with a normal sensitivity. In such a case, a lower compression rate is applied to the RAW image data than in a case of applying the gain that corresponds to capturing in accordance with normal sensitivity. By such a configuration, it is possible to reduce the amount of data stored in the image memory 105 or the amount of data transmitted to or from the image memory 105, in a case of capturing in accordance with either the normal sensitivity or the expanded high sensitivity.

The configuration of the image processing unit 104 is explained in detail below. The sensor correcting unit 201 performs, on RAW image data outputted from the A/D conversion unit 103, pre-processing that includes signal correction processing for defective pixels in the image sensor 102. In addition, the sensor correcting unit 201 may perform shading for correcting decreased marginal illumination of a lens as pre-processing.

The RAW compression unit 202 compresses RAW image data to which pre-processing was performed by the sensor correcting unit 201, and temporarily stores the compressed RAW image data in the image memory 105. The RAW decompression unit 203 reads the temporarily stored compressed RAW image data from the image memory 105, decompresses it, and outputs it to the gain adjustment unit 205. The RAW compression unit 202 and the RAW decompression unit 203 each compress or decompress RAW image data by using a lossy compression/decompression method. In addition, the RAW compression unit 202 may perform fixed length coding, for example. In such a case, an outlook with respect to capacity of a storage region for image data required in the image memory 105 or a transmission load on the memory bus becomes easy to see. In addition, the RAW compression unit 202 and the RAW decompression unit 203 can perform compression/decompression processing at compression rates that differ in accordance with a control signal from the control unit 107 for designating a compression rate. In such a case, image quality degradation of decompressed image data is suppressed in a case of performing compression/decompression processing by a low compression rate, in comparison to a case of performing compression/decompression processing by a high compression rate. Description is given later regarding processing for controlling a compression rate with respect to the RAW compression unit 202 and the RAW decompression unit 203.

Based on image data supplied from the RAW decompression unit 203, the feature calculation unit 204 performs processing for calculating a feature amount for AF, AE, AWB (Auto White Balance) or the like, and outputs a calculation result to the control unit 107. Based on the processing for calculating this feature amount, the control unit 107 calculates a focus lens control signal for AF, an exposure control signal for AE, a gain control signal for AWB, or the like.

The gain adjustment unit 205 applies to the image data a gain that corresponds to capturing in accordance with the normal sensitivity or to capturing in accordance with the expanded high sensitivity. As described later, because an image captured in accordance with the expanded high sensitivity has a low luminance, the gain adjustment unit 205 applies, when capturing in accordance with the expanded high sensitivity, a gain higher than when capturing in accordance with the normal sensitivity. The gain adjustment unit 205 changes an amount of gain to apply based on a gain control signal inputted from the control unit 107, and applies this gain to the image data outputted from the RAW decompression unit 203.

The WB adjustment unit 206 applies a WB gain corresponding to a control signal from the control unit 107 to the image data for which the gain was adjusted by the gain adjustment unit 205. The WB adjustment unit 206 may convert the image data after WB adjustment to a Y (luminance) signal and a C (color difference) signal, and output the converted image data to the compression/decompression unit 207.

The compression/decompression unit 207 performs compression coding processing in accordance with a predetermined coding method such as JPEG on the image data outputted from the WB adjustment unit 206. In addition, it can apply decompression/decoding processing on image data supplied from the storage medium I/F 109 via the control unit 107, and convert a resolution of the image data to a resolution for the display unit 106. Note that the compression/decompression unit 207 may change the resolution of image data before performing compression coding processing. For example, it may convert the resolution of the image data outputted from the WB adjustment unit 206 in accordance with a control signal from the control unit 107. This conversion is processing to make a conversion to a resolution suitable for the display unit 106 or to a resolution designated for recording to the storage medium for example, and to generate image data for display or for recording.

The display processing unit 208 includes an NTSC encoder, for example, and generates an image signal for displaying on the display unit 106 from inputted image data. The generated image signal is outputted to the display unit 106. In addition, the display processing unit 208 can composite image data for composition that is supplied from the control unit 107 with image data supplied from the compression/decompression unit 207, and output a result thereof to the display unit 106. The image data for composition includes a GUI or image data for visualizing an image capturing condition or a feature of a subject. The display processing unit 208 composites a luminance histogram of a captured image which is image data for composition with image data from the compression/decompression unit 207, and displays a result thereof on the display unit 106, for example.

Note that the image processing unit 104 may be configured so that, in the course of processing image data by each functional unit (for example, the WB adjustment unit 206, the compression/decompression unit 207, and the display processing unit 208), reads or writes a portion of image data to be processed from or to the image memory 105 as appropriate.

(Control of Compression Rate with Respect to RAW Image Data Corresponding to Gain)

As described above, the RAW compression unit 202 and the RAW decompression unit 203 are configured so as to perform lossy compression/decompression processing. Therefore, there are cases that involve image quality degradation when image data is compressed and decompressed in accordance with a lossy compression method, and in particular image quality degradation may be emphasized when a large gain is applied to decompressed image data.

However, when the capturing sensitivity is set to the expanded high sensitivity, the gain adjustment unit 205 applies, to the image data decompressed by the RAW decompression unit 203, a gain larger than in the case where capturing is performed with the capturing sensitivity set to the normal sensitivity. Therefore, in the present embodiment, when a large gain corresponding to the expanded high sensitivity is applied, the compression rate for compression/decompression processing in the RAW compression unit 202 and the RAW decompression unit 203 is caused to decrease. In this way, by controlling the image quality of decompressed image data, degradation of image quality after a gain adjustment is caused to decrease.

In addition, generally it is relatively easy for image quality degradation to occur when performing compression if inputted image data includes many high-frequency components or if a dynamic range of the image data is wide. In particular, in a case of performing fixed length coding in which the compression rate is changed by units of a plurality of pixels, a high compression rate is necessary the more high-frequency components of inputted image data there are or the wider the dynamic range. In other words, when a high gain is applied to decompressed image data, image quality degradation may be emphasized. Conversely, because a low compression rate is sufficient the more low-frequency components of the inputted image data there are or the narrower the dynamic range is, image quality degradation tends not to be emphasized even if a high gain is applied to decompressed image data. Note that, if variable length coding is used on inputted image data, and if the inputted image data includes many high-frequency components or has a wide dynamic range, it is necessary to have a low compression rate to suppress image quality degradation. In contrast, if the inputted image data includes many low-frequency components or has a narrow dynamic range, the compressed image data will be smaller and have little image quality degradation even if the compression rate is set low, because correlation between pixels is high.

Figure 3A:
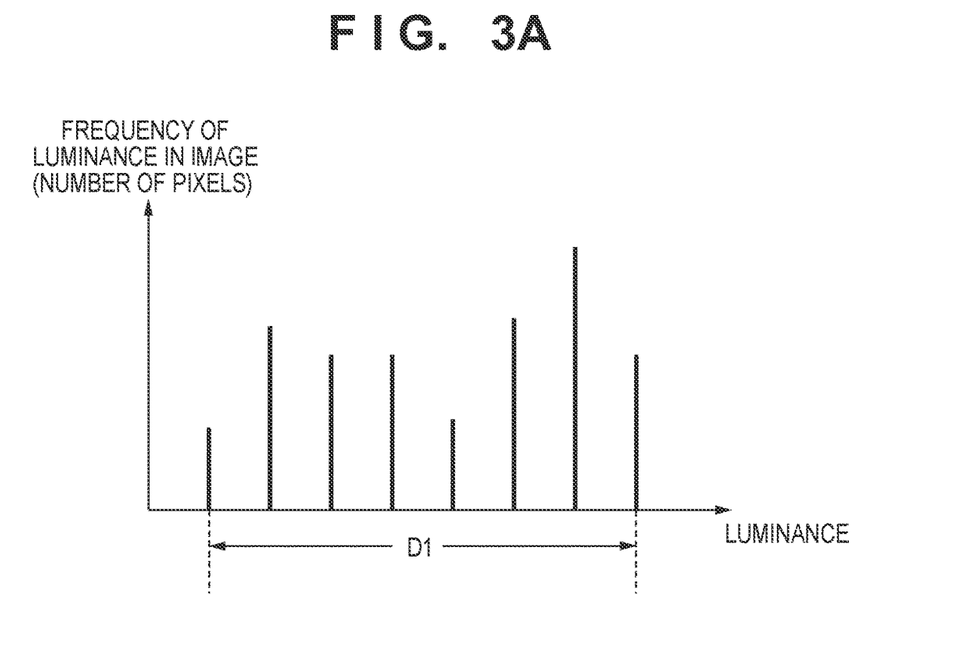
FIGS. 3A and 3B are views for describing a feature of image data which is captured with a normal sensitivity and an expanded high sensitivity.
Figure 3B:
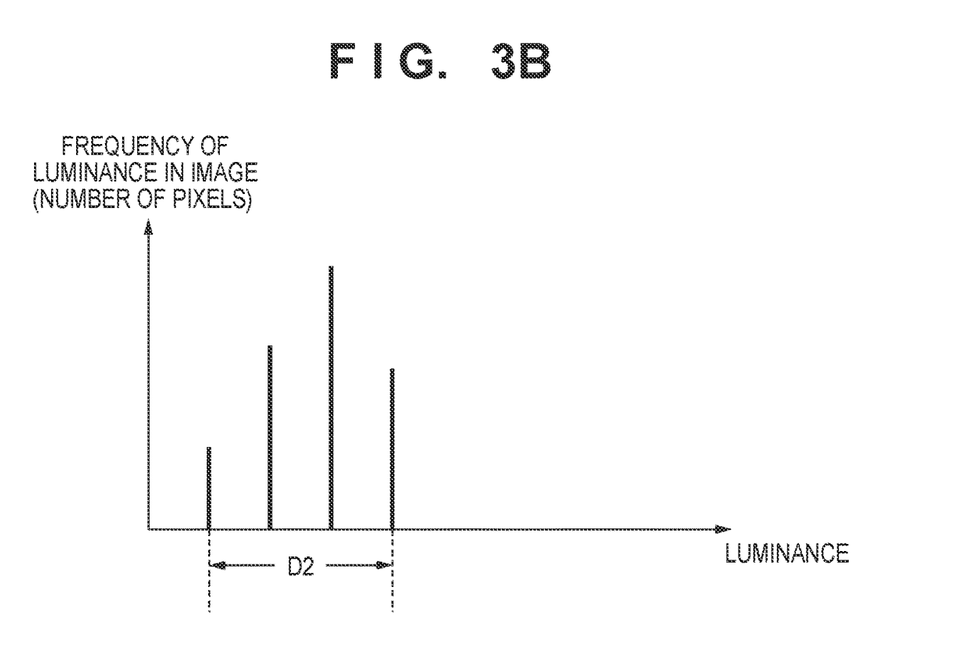

Next, with reference to FIGS. 3A and 3B, explanation is given regarding characteristics of a dynamic range and high-frequency components of image data captured in accordance with expanded high sensitivity. FIG. 3A illustrates a luminance distribution of an image in a case of capturing in accordance with normal sensitivity, and FIG. 3B illustrates a luminance distribution in an image in a case of capturing in accordance with expanded high sensitivity. Note that, in FIGS. 3A and 3B, the abscissa represents distributions of luminance in an image, and the ordinate represents luminance frequency (a number of pixels) in the image. In addition, D1 and D2 indicate dynamic ranges of image data when capturing in accordance with the normal sensitivity and when capturing in accordance with the expanded high sensitivity, respectively.

In image data captured in accordance with the normal sensitivity (FIG. 3A), generally luminance in an image is widely distributed from low luminance to high luminance (there is a wide dynamic range). In contrast, in image data captured in accordance with the expanded high sensitivity (FIG. 3B), capturing is performed with a high capturing sensitivity that is outside of the range that can be converted by the A/D conversion unit 103, and luminance in the image is distributed in a narrow range from low luminance, in comparison to when capturing in accordance with normal sensitivity (there is a narrow dynamic range).

In this way, image data captured in accordance with expanded high sensitivity has many low-frequency components and requires application of a high gain, so, the compression rate to apply in the RAW compression unit 202 is controlled as described above, and degradation of image quality for image data after decompression processing and after a gain adjustment is thereby reduced.

In the present embodiment, because it is possible to compress image data even when capturing in accordance with the expanded high sensitivity in addition to the normal sensitivity, it is possible to reduce a transmission load on the memory bus during an image capturing operation, and shorten time required for read or write processing with respect to the image memory 105. In other words, it is possible to suppress power consumption by reducing a transmission frequency on the memory bus, and reduce the capacity of the image memory 105, and capturing in accordance with an expanded high sensitivity is possible even in an apparatus for which power saving or space-saving is required. Furthermore, even in a case of performing capturing in accordance with the expanded high sensitivity, it is possible to arrange a free area in the memory space by reducing a data amount occupied in the image memory 105. In addition, in a case of storing a plurality of pieces of RAW image data for use in a moving image or continuous shooting, in capturing in accordance with an expanded high sensitivity, a number of images that can be stored increases and write/read speed for a series of images improves. Therefore, it is possible to allow for an increase in frame rate (or an improvement of continuous shooting speed), or an increase of a number of captures made by continuous shooting at a time of such capturing.

(Configuration of Control Unit 107)

Figure 4:
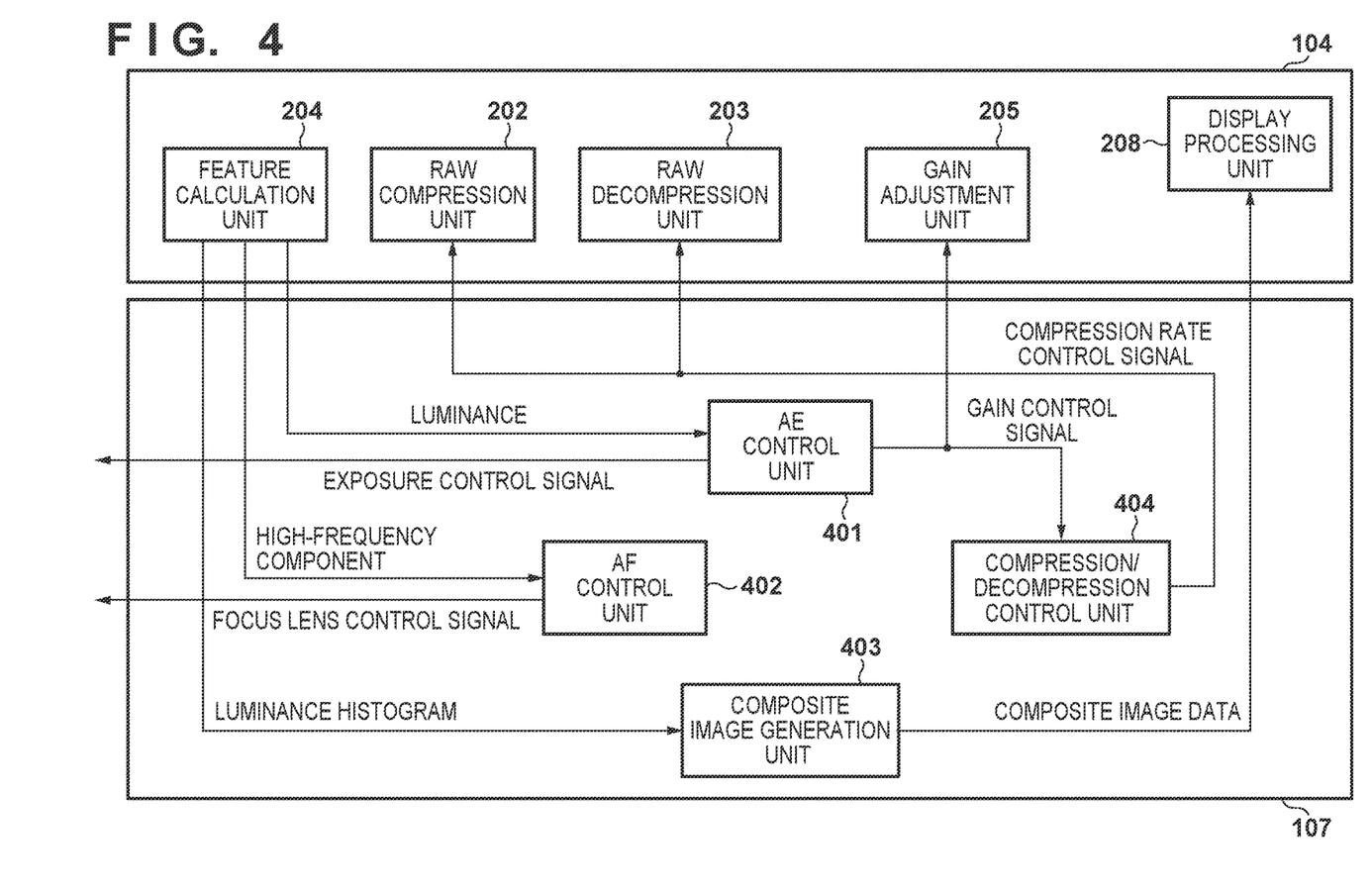
FIG. 4 is a block diagram which illustrates a functional configuration example of a control unit for controlling operation of an image processing unit.

Next, with reference to FIG. 4, explanation is given of a configuration of the control unit 107 which controls each unit of the image processing unit 104 (in particular, the RAW compression unit 202, the RAW decompression unit 203, the gain adjustment unit 205, and the display processing unit 208).

An AE control unit 401 determines, based on a luminance calculated by the feature calculation unit 204, whether or not the imaging optical system 101 is being controlled to an appropriate exposure in accordance with a control signal (an exposure control signal) for realizing AE. Upon determining that there is not an appropriate exposure, the AE control unit 401 updates the exposure control signal with respect to the imaging optical system 101 so as to achieve an appropriate exposure. The AE control unit 401 determines whether the imaging optical system 101 is being controlled to an appropriate exposure based on an integrated value of luminances for each frame (or for each predetermined region in a frame) from the feature calculation unit 204, for example. Note that the AE control unit 401 may control the exposure control signal based on a detection result in accordance with a brightness detector separately provided on the digital camera 100 instead of the luminance based on the image data in accordance with the feature calculation unit 204. Alternatively, it may control the exposure control signal based on both of a calculation result by the feature calculation unit 204 and a detection result in accordance with the brightness detector.

The determination for exposure control described above is executed when a release button in the operating unit 108 is pressed halfway by a user in a case of capturing of a still image, for example. In contrast, in a case of capturing of a moving image, it is executed as necessary (for example, every predetermined amount of time) during recording of moving image data. Of course, the determination for exposure control may be performed every predetermined amount of time even when capturing a still image.

To control an exposure state, the AE control unit 401 outputs an exposure control signal for controlling shutter speed (an exposure time) or a diameter of an aperture in the imaging optical system 101, and a gain control signal for controlling an amount of gain to apply in the gain adjustment unit 205. Generally, when the captured scene is dark and sufficient brightness still cannot be achieved even after controlling the aperture or the shutter speed, the AE control unit 401 makes an instruction to the gain adjustment unit 205 so as to apply a gain. In addition, in capturing accordance with an expanded high sensitivity, the AE control unit 401 generates a gain control signal so that a gain higher than when capturing in accordance with a normal sensitivity is applied. The gain control signal is outputted to the gain adjustment unit 205, and is also supplied to a compression/decompression control unit 404 of the control unit 107. When determining a gain to be applied, the AE control unit 401 may determine the gain after obtaining information representing a sensitivity set in the image sensor 102, and may determine the gain after obtaining a setting value that has been set by a user via the operating unit 108.

An AF control unit 402 controls a focus lens control signal for driving a focus lens in the imaging optical system 101, based on high-frequency components calculated by the feature calculation unit 204. For example, the feature calculation unit 204 applies low-pass filter processing to input image data, integrates processed data for each frame (or for each predetermined region in a frame), and outputs an integrated value to the AF control unit 402 as high-frequency components. The AF control unit 402 executes processing for AF control at regular intervals or when the release button is half pressed. Regarding AF control, capturing is performed while causing the focus lens of the imaging optical system 101 to move little-by-little, and high-frequency components are obtained based on the acquired image data, for example. The AF control unit 402 causes the focus lens to move to a position having the most obtained high-frequency components.

A composite image generation unit 403 generates composite image data that is to be composited with captured image data in the display processing unit 208. For example, a luminance histogram indicating frequencies for luminances in an image is obtained from the feature calculation unit 204, and composite image data representing the luminance histogram is generated. The composite image generation unit 403 generates composite image data that is to be composited with an image in the display processing unit 208. For example, when display of a luminance histogram to the operating unit 108 is requested, the control unit 107 outputs to the display processing unit 208, as composite image data, a luminance histogram of image data currently held.

Figure 5:
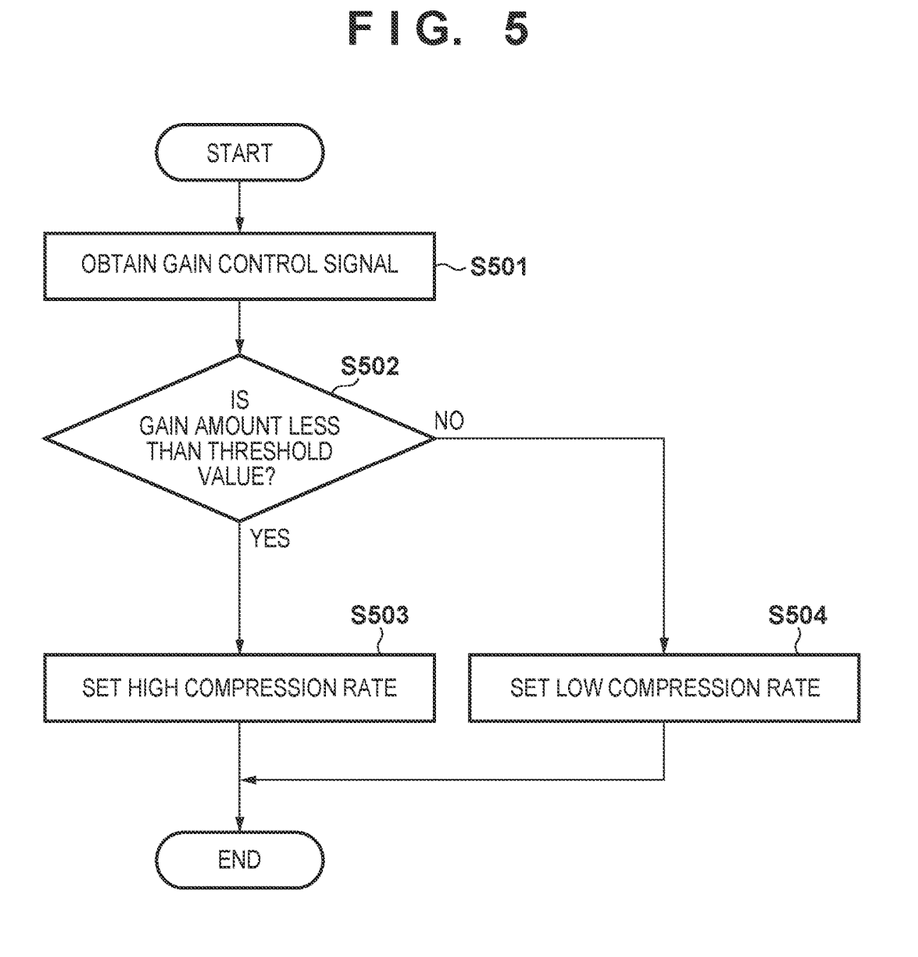
FIG. 5 is a flowchart that illustrates a series of operations for compression rate control processing.

Based on a gain control signal from the AE control unit 401, the compression/decompression control unit 404 controls a compression rate with respect to a RAW image (may be simply referred to as compression rate control processing) and gain adjustment in the image processing unit 104. With reference to FIG. 5, explanation is given regarding compression rate control processing in the compression/decompression control unit 404.

(Series of Operations for Compression Rate Control Processing)

With reference to the flowchart illustrated in FIG. 5, explanation is given regarding a series of operations for compression rate control processing. Note that this processing is realized by the control unit 107 loading a program stored in the non-volatile memory 110 into the volatile memory 111 and executing the program to execute the function of the compression/decompression control unit 404. Note that this processing is executed each time a signal such as a gain control signal for image data is inputted to the control unit 107 from the image processing unit 104 after one frame's worth of image data is inputted to the image processing unit 104 from the A/D conversion unit 103, for example.

In step S501, the compression/decompression control unit 404 obtains a latest gain control signal outputted from the AE control unit 401.

In step S502, the compression/decompression control unit 404 determines whether there is capturing in accordance with the expanded high sensitivity, based on the obtained gain control signal. Specifically, the compression/decompression control unit 404 compares a gain amount based on the obtained gain control signal, and a predetermined gain amount threshold value that is determined in advance. The gain amount threshold value is a threshold value for determining whether the gain amount based on the obtained gain control signal is a gain amount to be applied when capturing in accordance with the expanded high sensitivity, or a gain amount to be applied in capturing in accordance with the normal sensitivity. When the gain amount based on the gain control signal is less than the threshold value, the compression/decompression control unit 404 determines that the gain amount based on the obtained gain control signal is a gain amount to be applied when capturing in accordance with the normal sensitivity, and advances the processing to step S503. Meanwhile, when the gain amount based on the gain control signal is greater than or equal to the threshold value, it is determines that the gain amount based on the obtained gain control signal is a gain amount to be applied when capturing in accordance with the expanded high sensitivity, and the processing is advanced to step S504.

In step S503, the compression/decompression control unit 404 sets a compression rate with respect to both compression processing by the RAW compression unit 202 and decompression processing by the RAW decompression unit 203 to a high compression rate. In other words, the compression/decompression control unit 404 sets the compression rate in the foregoing compression processing and the decompression processing to a compression rate higher than in capturing in accordance with the expanded high sensitivity, because capturing in accordance with the normal sensitivity is to be performed.

In step S504, the compression/decompression control unit 404 sets a compression rate with respect to both compression processing by the RAW compression unit 202 and decompression processing by the RAW decompression unit 203 to a low compression rate. In other words, the compression/decompression control unit 404 sets the compression rate in the foregoing compression processing and the decompression processing to a compression rate lower than in capturing in accordance with the expanded high sensitivity, because capturing in accordance with the normal sensitivity is to be performed. When the processing of step S503 or step S504 ends, the compression/decompression control unit 404 subsequently ends the compression control processing.

As explained above, configuration is such that the compression/decompression control unit 404 compresses RAW image data to be written to an image memory even when applying a gain that corresponds to capturing in accordance with the expanded high sensitivity. In addition, configuration is such that the compression rate in the case of applying a gain corresponding to capturing in accordance with the expanded high sensitivity is set lower than a compression rate set when applying a gain corresponding to capturing in accordance with a normal sensitivity. In this way, even when capturing in accordance with an expanded high sensitivity, it is possible to accelerate image capturing processing by shortening time needed for writing of RAW image data to the image memory 105 via the memory bus, and reading of RAW image data from the image memory 105. In addition, by compressing RAW image data by a low compression rate, it is possible to suppress image quality degradation even in a case where a higher gain is applied. In other words, it is possible to reduce a load of transmitting a captured image to an image memory, while suppressing a decrease in quality of an image to which a gain has been applied. In addition, because there is a low brightness difference and high similarities for luminances in capturing in accordance with an expanded high sensitivity, there are case where it is possible to expect a large decrease in bandwidth in accordance with setting the compression rate to a low compression rate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-256765, filed Dec. 28, 2016, which is hereby incorporated by reference herein in its entirety.

What is claimed is:

1. An image capturing apparatus, comprising:
an image sensor configured to output image data captured at any of two or more sensitivities;
an image memory;
one or more processors; and
a memory storing instructions which, when the instructions are executed by the one or more processors, cause the image capturing apparatus to function as:
    a control unit configured to control a predetermined compression rate for compressing image data outputted from the image sensor;
    a compression unit configured to compress the image data outputted from the image sensor at the predetermined compression rate;
    a storage unit configured to temporarily store the image data compressed by the compression unit in the image memory;
    a decompression unit configured to decompress the compressed image data read from the image memory; and
    an application unit configured to apply a gain amount corresponding to a sensitivity of the two or more sensitivities to the image data decompressed by the decompression unit,
wherein the control unit controls the predetermined compression rate so that a compression rate in a case where a first gain amount larger than a predetermined gain amount is applied to the decompressed image data is less than a compression rate in a case where a second gain amount less than the predetermined gain amount is applied to the decompressed image data, and wherein the first gain amount is a gain amount applied in a case where the sensitivity is a sensitivity higher than a common-use sensitivity, and the second gain amount is a gain amount applied in a case where the sensitivity is the common-use sensitivity.

2. The image capturing apparatus according to claim 1, wherein the sensitivity higher than the common-use sensitivity corresponds to an expanded high sensitivity.

3. The image capturing apparatus according to claim 1, wherein the control unit also controls the gain amount applied in the application unit in accordance with the sensitivity when capturing.

4. The image capturing apparatus according to claim 1, wherein the instructions, when the instructions are executed by the one or more processors, further cause the image capturing apparatus to function as:

a setting unit configured to allow a user to set the sensitivity, wherein the control unit also controls the gain amount applied in the application unit in accordance with the sensitivity set by the setting unit.

5. The image capturing apparatus according to claim 1, wherein the compression unit compresses the image data outputted from the image sensor by a lossy compression method.

6. A control method of an image capturing apparatus that has an image sensor operable to output image data captured by any of two or more sensitivities, an image memory, and a control unit, the method comprising:

controlling a predetermined compression rate applied to image data outputted from the image sensor by the control unit;

compressing the image data outputted from the image sensor at the predetermined compression rate;

temporarily storing the compressed image data in the image memory;

decompressing the compressed image data read from the image memory; and applying a gain amount corresponding to a sensitivity of the two or more sensitivities to the decompressed image data, wherein the predetermined compression rate is controlled so that a compression rate in a case where a first gain amount larger than a predetermined gain amount is applied to the decompressed image data is less than a compression rate in a case where a second gain amount less than the predetermined gain amount is applied to the decompressed image data, and wherein the first gain amount is a gain amount applied in a case where the sensitivity is a sensitivity higher than a common-use sensitivity, and the second gain amount is a gain amount applied in a case where the sensitivity is the common-use sensitivity.

7. A non-transitory computer-readable storage medium storing a program for causing a computer to execute a control method of an image capturing apparatus that has an image sensor operable to output image data captured at any of two or more sensitivities, an image memory, and a control unit, the method comprising:

controlling a predetermined compression rate applied to image data outputted from the image sensor by the control unit;

compressing the image data outputted from the image sensor at the predetermined compression rate;

temporarily storing the compressed image data in the image memory;

decompressing the compressed image data read from the image memory; and applying a gain amount corresponding to a sensitivity of the two or more sensitivities to the decompressed image data, wherein the predetermined compression rate is controlled so that a compression rate in a case where a first gain amount larger than a predetermined gain amount is applied to the decompressed image data is less than a compression rate in a case where a second gain amount less than the predetermined gain amount is applied to the decompressed image data, and wherein the first gain amount is a gain amount applied in a case where the sensitivity is a sensitivity higher than a common-use sensitivity, and the second gain amount is a gain amount applied in a case where the sensitivity is the common-use sensitivity.

* * * * *